Figure 1:
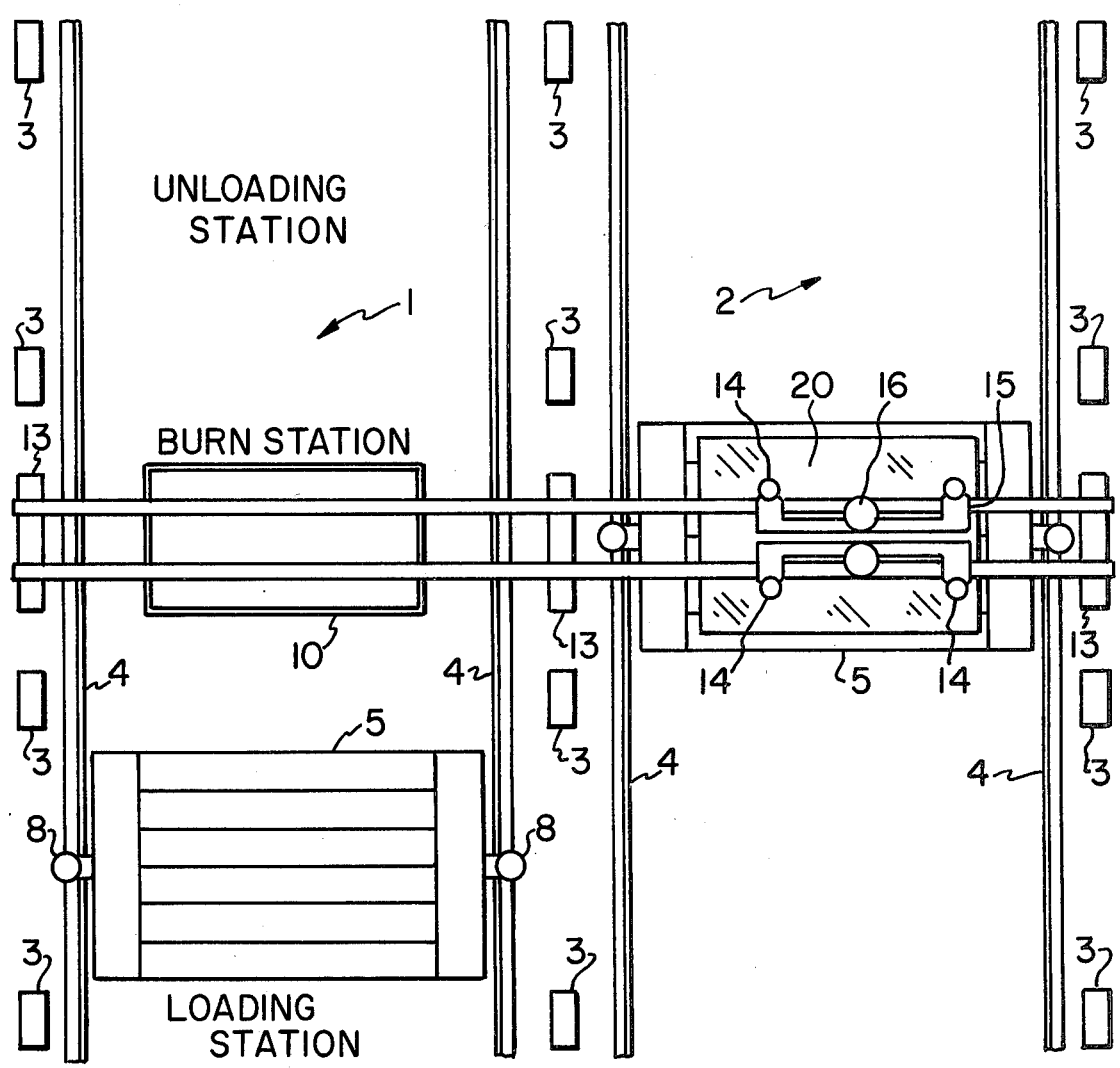

United States Patent [19]

Anderson

[11] 4,143,861
[45] Mar. 13, 1979

[54] FLAME CUTTING LAYOUT

[75] Inventor: Harry E. Anderson, Pittsburgh, Pa.

[73] Assignee: Anderson Engineers, Inc., Carnegie, Pa.

[21] Appl. No.: 824,639

[22] Filed: Aug. 15, 1977

[51] Int. Cl.² .............................................. B23K 7/10
[52] U.S. Cl. .................................... 266/49; 266/69; 266/142
[58] Field of Search ................... 266/48, 49, 65, 67, 266/68, 69, 72, 142

[56] References Cited

U.S. PATENT DOCUMENTS

| | | | |
|---|---|---|---|
| 2,622,871 | 12/1952 | Martin | 266/69 X |
| 2,723,845 | 11/1955 | Przybylski et al. | 266/67 X |
| 3,434,212 | 3/1969 | Kleine et al. | 266/67 X |
| 3,743,260 | 7/1973 | Alleman et al. | 266/49 |

FOREIGN PATENT DOCUMENTS 289877  8/1971  U.S.S.R. ................................ 266/65

Primary Examiner—Roy Lake
Assistant Examiner—Paul A. Bell
Attorney, Agent, or Firm—Webb, Burden, Robinson & Webb

[57] ABSTRACT

A flame cutting layout comprising at least two parallel processing lines each having longitudinally guided support frames for moving workpieces from loading to burning to unloading stations. A stationary bridge spanning both lines guides and supports at least one cutting torch over the burning station in either processing line. A controller, such as a numerical tape controller, simultaneously controls the longitudinal movement of the support frames and transverse movement of the torch to enable a workpiece to be cut in a desired pattern at the burning station in either processing line.

3 Claims, 2 Drawing Figures

FLAME CUTTING LAYOUT

This invention relates to the art of flame cutting wherein torches are caused to move above the surface of the metal plates cutting shapes therefrom. Typically in prior art flame cutting layouts the torch or torches are mounted on a moveable bridge spanning the workpiece. The bridge is guided and moves longitudinally relative to the workpieces. The torches are guided and supported on the bridge and move transversely relative to the workpieces. The workpiece is supported on a table below the moveable bridge. The workpiece table may be fixed during cutting or it may move longitudinally in one direction during cutting. A typical prior art flame cutting machine is illustrated in U.S. Pat. No. 3,912,242.

The movement of torches and flame cutters may be controlled in well-known ways, either by mechanical tracer controls, photo tracer controls, or numerical tape controls, for example. In the prior art layouts, the torches are moved relative to the ground in both x and y directions, that is in both longitudinal and transverse directions. For example, a rack may be fixed to the moveable bridge and a pinion journaled to a carriage for the flame cutter which carriage moves along the bridge. Similar or the same means may be arranged to move the bridge longitudinally relative to the ground. Hydraulic servo motors or electrical stepping motors which are adaptable to precise control have been used to actuate the pinions or whatever like devices are used.

Prior flame cutter layouts have had as a drawback that torches for a given processing line remain idle during loading and unloading of workpieces at that line. The cutting torches are extremely expensive and the overall cost of prior layouts in which each processing line has its own torch or set of torches has relfected this cost. The present invention is directed to a cutting layout with reduced overall cost resulting from the use of one torch or set of torches on more than one processing line. The overall productivity of the flame cutting layout is not reduced because the torch or torches are used on one processing line while they would be idle if only assigned to an adjacent or nearby line which is being loaded or unloaded.

The intense concern for the protection of the environment and health of employees working near annoying or noxious fumes has resulted in the need for elaborate hoods and exhaust systems over cutting stations. Cutting layouts according to the instant invention facilitate the provision of hoods and exhaust systems by drastically reducing the area over which cutting torches operate. For the same reason, the water tables beneath the cutting stations needed for layouts according to this invention are drastically smaller than those used in prior art cutting stations considering the size of the workpieces involved.

Flame cutting layouts are as often as not installed in existing buildings. Finding a sufficiently large area within a building which is unobstructed by upright support columns is difficult. The prior cutting layouts required, in addition to clearance for the workpiece and the supporting table, lateral clearance for the mobile torch bridge and guide mechanisms associated therewith. The torch bridge had to be "outside" the space in which the workpiece moved but within the space between uprights. Flame cutting stations, according to this invention, enable wider workpieces to be handled in a given physical plant.

Further features and other objects and advantages of this invention will become clear from the following detailed description made with reference to the drawings.

Figure 2:
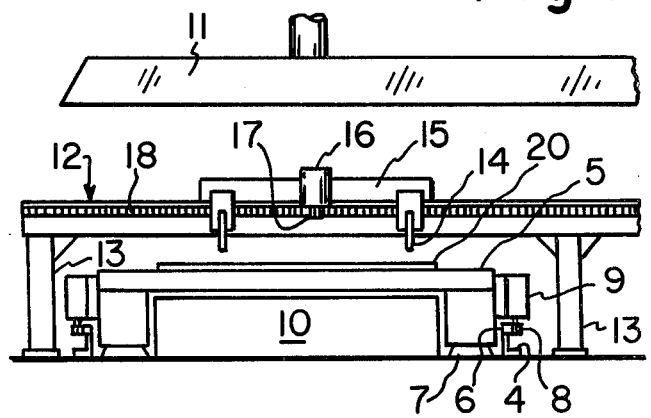

FIG. 1 is a plane view of a flame cutting layout according to this invention comprising two parallel processing lines, and FIG. 2 is an end view of the flame cutting layout of FIG. 1.

Referring now to the drawings, there is shown a flame cutting layout comprising two parallel adjacent processing lines. More than two lines are possible according to this invention. At least two lines are needed for this explanation. The upright columns 3 supporting the physical plant roof are shown. They impose an overall constraint on any flame cutting layout, but certainly less so in the case of this invention.

Between the three rows of columns are spaces wherein the first processing line 1 and second processing line 2 are disposed. Guide rails 4 run the length of each line for guiding support frames 5 in their longitudinal travel. It should be understood that the rails need not be tracks for supporting wheels turning thereon but may simply be guides as explained herein. According to a preferred embodiment, the rails comprise angles to which a rack 6 (for engaging pinions) is secured. A support frame 5 is supported by air casters 7, that is, without wheels at all. Pinion 8 and a driven shaft journaled to the support frame move the frame in the longitudinal direction. The shaft may be driven by a hydraulic motor 9 or the like.

Each processing line has a loading station where workpieces may be placed upon the support frame 5 and an unloading station where the workpieces cut to shape may be removed. Intermediate the load and unload station is a burning station. At each burning station there are provided fixed water tables 10 over which the torching is conducted and stationary exhaust hoods 11.

Spanning at least two processing lines is a stationary bridge 12. The bridge is supported above the water tables 10 and below the exhaust hood 11 by uprights 13 which may be aligned with the upright columns 3 supporting the physical plant roof or ceiling. The stationary bridge guides and supports the torches 14. The torches are mounted to the bridge in a well-known manner so that they can be automatically moved in either direction. For example, they may be mounted to a carriage 15 that carries a hydraulic motor 16 and pinion 17, which pinion engages a rack 18 fixed to the bridge. Most important however, the rack or equivalent device must be continuous and extended between the adjacent processing lines so that the torches may be moved rapidly from above one water table to above an adjacent water table.

This invention is applicable to cutting stations having multiple torches, which may have independent motors and pinions enabling them to cut different portions of the perimeter of the workpiece 20. Torches may also be arranged to work in unison as where the same shape is cut by each torch and multiple shapes may be cut from each workpiece. It is also possible according to this invention for the torches to be mounted on a double carriage in which a primary carriage moves between processing lines carrying with it all torches and the secondary carriage moves relative to the primary carriage during workpiece cutting.

Having thus described my invention in the detail and with the particularity required by the Patent Laws, what is desired protected by Letters Patent is set forth in the following claims.

I claim:

1. A flame cutting layout comprising:
   (a) at least two parallel processing lines having generally adjacent burn stations;
   (b) each processing line having traveling support frames moveable parallel to the processing line, said support frames being adapted to receive a workpiece and to move the workpiece to the burn station;
   (c) a stationary bridge spanning at least two burn stations;
   (d) at least one cutting torch guided and supported by the stationary bridge and moveable above at least two adjacent burn stations;
   (e) means for simultaneously controlling both the longitudinal movement of a support frame and the transverse movement of a torch at a given burn station such that a workpiece may be cut to a selected shape and whereby said cutting torch or torches can be used at at least two burn stations, one burn station at a time.

2. A flame cutting layout comprising:
   (a) at least two parallel processing lines having generally adjacent load, burn and unload stations in that sequence;
   (b) each processing line having stationary water tables and exhaust hoods in respective burn stations;
   (c) each processing line having traveling support frames only moveable parallel to the processing line, said support frames adapted to receive a workpiece at the load station, to move the workpiece to the burn station and then to move the workpiece to the unload station;
   (d) a staionary bridge spanning at least two adjacent water tables;
   (e) at least one cutting torch guided and supported by the stationary bridge and moveable above at least two adjacent water tables;
   (f) means for simultaneously controlling both the longitudinal movement of a support frame and the transverse movement of a torch at a given burn station such that a workpiece may be cut to a selected shape and whereby said cutting torch or torches can be used at at at least two burn stations, one burn station at a time.

3. A flame cutting layout according to claim 2 in which each support frame is carried by air casters.

* * * * *